(12) United States Patent
Peuchert et al.

(10) Patent No.: US 8,197,711 B2
(45) Date of Patent: *Jun. 12, 2012

(54) ACTIVE OPTOCERAMICS WITH CUBIC CRYSTAL STRUCTURE, METHOD OF PRODUCTION OF THE OPTOCERAMICS, AND USES THEREOF

(75) Inventors: Ulrich Peuchert, Bodenheim (DE); Yvonne Menke, Mainz (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/696,170

(22) Filed: Jan. 29, 2010

(65) Prior Publication Data

US 2010/0193739 A1    Aug. 5, 2010

(30) Foreign Application Priority Data

Feb. 2, 2009   (DE) .................. 10 2009 000 553

(51) Int. Cl.
C09K 11/06 (2006.01)
C09K 11/08 (2006.01)
G01T 1/20 (2006.01)

(52) U.S. Cl. .......... 252/301.17; 252/301.4 F; 250/361 R
(58) Field of Classification Search ............ 252/301.4 F, 252/301.4 R, 301.17; 501/152, 900; 250/361 R; 359/321, 337.3, 341.5, 620, 797
See application file for complete search history.

(56) References Cited

U.S. PATENT DOCUMENTS

| | | | |
|---|---|---|---|
| 6,437,336 B1 * | 8/2002 | Pauwels et al. | 250/361 R |
| 6,967,330 B1 * | 11/2005 | Lempicki et al. | 250/361 R |
| 7,324,285 B2 | 1/2008 | Reichel et al. | |
| 7,710,656 B2 * | 5/2010 | Peuchert et al. | 359/642 |
| 2008/0047482 A1 * | 2/2008 | Venkataramani | 117/7 |
| 2008/0102012 A1 | 5/2008 | Saito | |
| 2008/0213151 A1 * | 9/2008 | Yoshikawa et al. | 423/263 |
| 2008/0233406 A1 | 9/2008 | Hayashi | |
| 2008/0278823 A1 * | 11/2008 | Peuchert et al. | 359/664 |
| 2009/0202864 A1 * | 8/2009 | Feist et al. | 428/690 |
| 2010/0193739 A1 | 8/2010 | Peuchert et al. | |

FOREIGN PATENT DOCUMENTS

| | | |
|---|---|---|
| DE | 10 2006 045 072 | 3/2007 |
| DE | 10 2007 022 048 | 11/2008 |
| DE | 102007022048 A1 * | 11/2008 |
| JP | 2008-88349 | 4/2008 |
| WO | 2007/060816 | 5/2007 |

OTHER PUBLICATIONS

Ji et al., La2Hf2O7:Ti4+ ceramic scintillator for x-ray imaging, Mar. 2005, J. Mater. Res, vol. 20, No. 3, pp. 567-570.*
Ji et al., Fabrication and Spectroscopic Investigation of La2Hf2O7-Based Phosphors, Feb. 2007, Key Engineering Materials, High Performance Ceramics III, p. 577.*
Kamawura et al: IEEE Conference 2008, Dresden, Oct. 19-25, 2008, p. 67.
J. Rabeau: 4-th Laser Ceramics Symposium, Nov. 10-14, 2008, p. 114.
Pidol et al: "Scintillation Properties of Ce:Lu2 . . . " J. Cond. Mat. 15, 2003, pp. 2091-2102.
Malkin, Klimin et al: "Optical Spectroscopy of . . . " Physical Review B 70. 075112, 2004, pp. 075112-1-075112-9.
Klimin: "Stark Structure of the Yb . . . " Phys. Sol. State, 47(8), 2005, pp. 1376-1380.
Ji et al: "Fabrication of Transparent . . . " Electromechanical and Solid State Letters 8(7), H58-60, 2005.
Ji et al: "Fabrication of Transparent La2 . . . " Materials Research Bulletin 40, 2005, pp. 553-559.
Ji et al: "Preparation and Spectroscopic Properties of . . . "Material Letters 59, 2005, pp. 868-871.

* cited by examiner

*Primary Examiner* — Jerry Lorengo
*Assistant Examiner* — Lynne Edmondson
(74) *Attorney, Agent, or Firm* — Michael J. Striker

(57) ABSTRACT

The transparent polycrystalline optoceramic has single grains with a symmetric cubic crystal structure and at least one optically active center. The optoceramic has the following formula: $A_{2+x}B_yD_zE_7$, wherein $0 \leq x \leq 1.1$, $0 \leq y \leq 3$, $0 \leq z \leq 1.6$, and $3x+4y+5z=8$, and wherein A is at least one trivalent rare earth cation, B is at least one tetravalent cation, D is at least one pentavalent cation, and E is at least one divalent anion. The method of making the optoceramic includes preparing a powder mixture from starting materials, pre-sintering, sintering and then compressing to form the optoceramic. Scintillator media made from the optoceramic are also described.

24 Claims, No Drawings

ACTIVE OPTOCERAMICS WITH CUBIC CRYSTAL STRUCTURE, METHOD OF PRODUCTION OF THE OPTOCERAMICS, AND USES THEREOF

CROSS-REFERENCE

The invention claimed and described herein below is also described in German Patent Application 10 2009 00 0553.6, filed on Feb. 2, 2009 in Germany. The aforesaid German Patent Application, whose subject matter is incorporated by reference thereto, provides the basis for a claim of priority of invention for the invention described and claimed herein below under 35 U.S.C. 119 (a) to (d). The copending U.S. patent application Ser. No. 12/696,134, with the same title as above, contains subject matter related to this US patent application.

BACKGROUND OF THE INVENTION

1. Field of the Invention and Introduction

The present invention refers to optoceramics, doped with activator elements, and having high transmissions, high densities and high effective atomic numbers. The activator elements are preferably chosen from the group of rare earth ions; titanium ions or transition metal ions are also possible. The materials are suitable to absorb high-energy radiation (preferably X-ray and gamma radiation as well as corpuscular radiation) and transform it to photons of visible light.

These materials are therefore, for example, suited as scintillator media for e.g. medical imaging (CT, PET, SPECT or combined PET/CT systems), security (X-ray detectors) or can serve in object tracing or investigation (exploration, prospecting for resources). The crystallite grains, forming the materials of the present invention, have cubic crystal structures (point and space groups as well as atom layers isotypic to those of the pyrochlore or fluorite minerals) or are clearly derivable from both mentioned minerals in terms of crystal structure.

In the present invention the term "optoceramic" refers to an essentially single phase, polycrystalline material of cubic symmetry and high transparency that is based on an oxide or other chalcogenide. Consequently, optoceramics are a special subgroup of ceramics. In this context "single phase" means that at least more than 95% of the material, preferably at least 97%, more preferably at least 99%, and most preferably 99.5 to 99.9% of the material is present in the form of crystals of the target composition. The single crystallites are densely packed and densities, in relation to the theoretical densities, of at least 95%, preferably at least 98%, and more preferably at least 99% are achieved. Hence, the optoceramics are almost free of pores.

Optoceramics differ from conventional glass ceramics in that the latter comprises a high proportion of amorphous glass phase next to the crystalline phase. Also, conventional ceramics do not have such high densities as optoceramics. Neither glass ceramics nor ceramics show the advantageous properties of optoceramics as represented by specific refractive indices, Abbe numbers, values of relative partial dispersions and, above all, the advantageous high transparencies for light in the visible and/or infrared wavelength regions.

Scintillator materials are active materials that absorb high-energy radiation directly or via a multitude of intermediate steps, wherein electron-hole pairs are generated. Their recombination leads to excitation of adjacent activator centers. The latter is thereby elevated into a metastable excited state. The relaxation of which leads, dependent on the choice of activator and host material, to emission of electromagnetic radiation in the energy range of near UV to near IR, i.e. 200 nm to 1500 nm, preferably 300 nm to 1100 nm (secondary radiation). This radiation is transformed into electric signals by suitable optoelectronic converters (photomultipliers or photodiodes). Areas of application are in the medical field (imaging and diagnostics), industrial inspection, dosimetry, nuclear medicine and high-energy physics as well as security, object tracing and exploration.

The requirements for detector materials for detection and conversion of high-energy radiation (X-ray and gamma radiation) to visible light are manifold:

high light yield and high energy resolution,
high transmission for secondary radiation (for coupling out the yielded visible light),
high X-ray or gamma radiation absorption efficiency,
low destruction or quenching of radiation
high chemical and refractive optical homogeneity,
good workability and true to form highly precise post-processibility of the scintillator material,
emission wavelength geared to the sensitivity of the detector,
short decay times, also for improvement of resolutions in time-of-flight experiments as well as for enabling faster scan velocities in order to keep the dose of radiation to the patient as low as possible, and
low afterglow after extinction of excitation radiation.

Especially the aspects of high transmission as well as high X-ray and gamma radiation absorption cross sections are of extraordinary importance. Next, the material must be economically obtainable.

2. Description of the Related Art

Some CT-scintillators are known in the art, for example $(Y,Gd)_2O_3$:Eu (abbreviated "YGO") and $Gd_2O_2S$:Pr,Ce,F (abbreviated "GOS"). Both are used in the form of ceramics. Single crystal growth of big individual crystals is not possible or extremely expensive due to the very high melting and breeding temperatures (above 2000° C.).

By sintering suitable powders, these compositions can be produced relatively cost-effectively at low temperatures significantly lower than 2000° C.

The problem with GOS material is its low symmetry of the crystalline phase (hexagonal arrangement of the crystallites). Because of the birefringence properties of each crystal grain in the densely sintered structure, any optical photon is subject to unwanted scattering. Highly transparent GOS ceramics are intrinsically not obtainable.

Eu:YGO, for example with the composition Eu:$Y_{1.34}Gd_{0.66}O_3$ is as far as the density is concerned considerably more disadvantageous than GOS (about 5.92 g/cm$^3$). It is thus worse than GOS concerning absorption of incident radiation. Additionally, GOS has a disadvantageously long decay time of about 1 ms (millisecond).

A sintered translucent ceramic for gamma ray imaging is described in U.S. Pat. No. 6,967,330. It has a stoichiometry of Ce:$Lu_2SiO_5$. However the crystal structure is not cubic and sintering ceramics with high transparencies is not possible even with very small crystallite grains (along the lines of GOS).

A layered ceramic of the composition Ce:$Gd_2Si_2O_7$ (GPS) is described by Kamawura et al. (IEEE Conference 2008 Dresden 19. —Oct. 25, 2008, Proceedings, p. 67). It is especially suitable for detection of neutrons. The material was produced as a single crystal and then pestled to obtain a powder. The particle size is 50 to 100 μm. The material is not cubic and can thus not be sintered to transparent ceramics.

As a single crystal solution $CdWO_4$ is still in use. However, this material has critically high cleavage properties and is thus only obtainable with difficulties and unreliably. Further, toxic cadmium is used during production.

In his lecture (TCCA-33) during the $4^{th}$ Laser Ceramics Symposium (Nov. 10-14, 2008, Shanghai, China) J. Rabeau (Stanford University) described the production of transparent $Ce:La_2Hf_2O_7$ (LHO) ceramics for scintillator applications by hot pressing. By hot pressing good transparencies could not be achieved; furthermore, the transparent ceramic is not stable due to the high lanthanum amount and decomposes after some time as it reacts with the water in the air.

Single crystals of $Ce:Lu_2Si_2O_7$ (LPS) are described in Pidol, et al.: "Scintillation properties of $Ce:Lu_2Si_2O_7$, a fast and efficient scintillator crystal", J. Cond. Mat., 15 (2003), 2091-2102. These crystals have monoclinic symmetry; highly transparent ceramics are not obtainable. The material shows short decay times (38 ns) and low afterglow. However, light yield and energy resolution are only moderate.

A measure for the X-ray absorption capability of a scintillation host is the effective atomic number $Z_{eff}$. The effective atomic number describes the average atomic number of a mixture of different substances. It can for example be calculated according to the following equation:

$$Z_{eff} = \sqrt[2.94]{f_1 \times (Z_1)^{2.94} + f_2 \times (Z_2)^{2.94} + f_3 \times (Z_3)^{2.94} + \ldots}$$

wherein $f_n$ is the proportion of the total number of electrons that relates to the respective element and $Z_n$ is the atomic number of the respective element.

As a further index the product of the density and the fourth power of the effective atomic number $Z_{eff}$ is introduced. This index is proportional to the stopping power. Stopping power means the energy loss per wavelength unit of an incident particle, for example measured in MeV.

SELECTED SCINTILLATION HOSTS KNOWN IN THE ART HAVE THE FOLLOWING VALUES:

| | Type | Density, g/cm³ | $Z_{eff}$ | Density × $Z_{eff}^4$ (×10⁶) |
|---|---|---|---|---|
| $Y_{1.34}Gd_{0.66}O_3$ | ceramic | 5.92 | 48 | 33 |
| $Gd_2O_2S$ | ceramic | 7.34 | 59 | 91 |
| $CdWO_4$ | single crystal | 7.99 | 61 | 111 |
| $Gd_3Ga_5O_{12}$ | single crystal | 7.09 | 50 | 43 |
| $Lu_2Si_2O_7$ | single crystal | 6.23 | 61 | 84 |

Malkin, Klimin et al. (Phys. Rev. B 70, 075112 (2004)) and Klimin (Phys. Sol. State, 47(8), 1376-1380, 2005) report titanium-containing single crystalline pyrochlore phases comprising rare earth ions on the A position. A variant of $Yb^{3+}:Y_2Ti_2O_7$ was produced as polycrystalline sample. The work focuses on single crystals, ceramics are described, too. However, these are produced at too low temperatures so that they cannot be transparent. The compositions are unfavorable for scintillator systems, because the emission wavelength of the $Yb^{3+}$ ion is between 1000 nm and 1100 nm. The common optoelectronic converters in medical imaging system are not designed for such wavelengths.

Similar considerations apply to Schott's application DE 10 2007 022 048, wherein however only very small amounts of rare earth ions like Pr, Nd, Sm, Eu, Tb, Dy, Ho, Er and Tm in the range <100 ppm are allowed due to the respective applications. Namely, it concerns passive ceramics.

In Ji, et al. "Fabrication of transparent $HfO_2$ (40%)-$Gd_2O_3$: Eu ceramics from nanosized powders" (Electrochemical and Solid State Letters 8(7), H58-60, 2005) Eu-activated polycrystalline $Gd_2O_3$ is described which is stabilized by $HfO_2$. The composition of the ceramics complies with $Gd_{1.5}Hf_{0.5}O_{3.25}=3Gd_2O_3*2HfO_2$, converted into molar proportions the composition is about 60 mol % $Gd_2O_3$ and 40 mol % $HfO_2$. Its structure, however, is neither stably cubic nor isotypic to that of the pyrochlores at room temperature (defect structure derived from the fluorite structure). Potential application is in the field of medical diagnostics (CT detector).

So-called "transparent" ceramics of the composition $La_2Hf_2O_7$ (LHO) are known from Ji, et al., "Fabrication of transparent $La_2Hf_2O_7$-ceramic from combustion synthesized powders", Mat. Res. Bull., 40(3), 553-559 (2005). Therein, powders of the target composition are used which had been synthesized by combustion reactions. The ceramics obtained thereby are at most translucent and free of rare earth ions.

It is clear from the state of the art that the currently described materials often do not have a highly symmetric cubic crystal structure (can therefore not be sintered to high transparency) and/or are in the form of a single crystal or layer that is not transparent. This is undesirable. As far as symmetric structures, if applicable also polycrystalline, are proposed they often do not satisfy the requirements of active material. As far as pyrochlore or fluorite structures are proposed at all they do not comply with current requirements. The variants that are known so far are either not transparent or only translucent and/or the density and/or the effective atomic number are too low or production is difficult. In case of La-containing forms the respective powders are additionally very hygroscopic and are only very difficultly convertible into transparent ceramics. Ceramics having pyrochlore structure and containing high amounts of Ti must be subjected to thermal post-processing in order to eliminate coloration by $Ti^{3+}$ created in the reducing manufacturing process.

SUMMARY OF THE INVENTION

It is the object of the present invention to provide a polycrystalline optoceramic having high transparency, preferably as a scintillator material, which can be produced via powder routes, and thus cost-effectively and in high quality in terms of transmission of secondary radiation.

The material should have a density that is as high as possible, ideally >5.0 g/cm³, preferably >6.0 g/cm³, especially preferably >7.0 g/cm³, exceptionally preferably >7.5 g/cm³ and/or have a high effective atomic number or a high product of density and the fourth power of the effective atomic number. Further, the material should satisfy all requirements for use in scintillator devices.

The object of the present invention is attained by the optoceramic, method of producing, and uses according to the appended claims.

The object is especially attained by optically transparent polycrystalline optoceramics with a symmetric cubic structure of the single grains with at least one optically active center, preferably selected from the group consisting of rare earth ions, transition metal ions and titanium ions, wherein the optoceramics can be described by the following general formula:

$A_{2+x}B_yD_zE_7$, wherein $0 \leq x \leq 1.1$, $0 \leq y \leq 3$, $0 \leq z \leq 1.6$, and $3x+4y+5z=8$ and A is at least one trivalent cation from the group of rare earth ions, B is at least one tetravalent cation, is at least one pentavalent cation, and E is at least one divalent anion.

It is especially preferred that $0 \leq x \leq 1.0$, further preferred $0 \leq x \leq 0.9$, more preferred $0 \leq x \leq 0.5$, even more preferred $0 \leq x \leq 0.25$. Further, it is preferred that $x \geq 0.11$, particularly preferred $\geq 0.13$ and especially preferred $\geq 0.15$.

Only such optoceramics are in accordance with this invention. Namely, the single grains according to the invention have symmetric cubic structures. Meant are such cubic structures that are analogous to those of the minerals pyrochlore or fluorite, i.e. are unambiguously derivable from them in terms of crystal structure.

By observing the above-mentioned requirements, the particularly advantageous optoceramics of the present invention can be obtained. Especially the outstandingly advantageous transmission properties of the present optoceramics are achievable with the above-mentioned stoichiometries.

Pyrochlores are crystalline phases of cubic symmetry and can be modified in their crystal chemistry in multiple ways. Materials with pyrochlore structure have the general formula $A_2^{3+}B_2^{4+}O_7$ or $A_3^{3+}B^{5+}O_7$. The pyrochlore family is extraordinarily large. The crystal structure is cubic and accepts a multitude of isotypes and mixed valence substitution on the A-position as well as on the B-position. Depending on ion radii compositions of the stoichiometries $A_2B_2E_7$ or $A_3DE_7$ crystallize either in the orthorhombic weberite type, the monoclinic perowskite type, the cubic fluorite type or the cubic pyrochlore type. Only the two last mentioned scintillator materials are suitable in accordance with the present invention.

In accordance with the present invention such optoceramics are preferred that have an effective atomic number $Z_{eff} \geq 50$, preferably 52, especially preferred 57, exceptionally preferred $\geq 60$. This is achieved by suitable combination of elements on the A- and B-positions.

A is preferably selected from the group consisting of Y, Gd, Yb, Lu, Sc, La and mixtures of these components. Further preferred A is selected from Y, Gd, Yb, Lu, Sc and mixtures of these components. Most preferred A is selected from Gd, Lu, Yb and mixtures of these components; exceptionally preferred A is selected from the group consisting of Gd, Lu and mixtures of these two components.

In accordance with the invention B is preferably selected from the group consisting of Zr, Ti, Hf, Sn, Ge and mixtures of these components. It is further preferred that B is selected from Zr, Ti, Hf and mixtures of these components. In a special embodiment B is selected from Zr, Hf and mixtures of these two components. In another preferred embodiment B is selected from Ti, Hf and mixtures of these two components.

In a further embodiment Ti is preferably present in amounts of up to 50,000 ppm and further preferred in an amount of up to 30,000 ppm (mass proportion). In such an amount Ti is functioning more as a sintering aid than as host material. If Ti shall be applied as a dopant, amounts in the range of from up to 5 atomic percent, preferably up to 3 atomic percent relating to the powder mixture of the starting material are preferred.

In a special embodiment the optoceramic according to the present invention comprises La as a secondary component on the A-position in an amount of up to 10 mol percent of the respective oxide or sulphide next to a main A-component.

The component D in the optoceramic according to the present invention is preferably selected from Nb and Ta.

It is especially preferred that the optoceramic according to the present invention is in accordance with the stoichiometry $A_2B_2E_7$. It is further preferred that there is a surplus of the A component, preferably in the range of from >2.2 mol %, further preferred >2.5 mol %, and particularly preferred >3 mol %.

The E position in the optoceramic according to the present invention is preferably occupied by a chalcogene or a mixture of several chalcogenes. In a preferred embodiment E is oxygen. In an alternative embodiment E is a mixture of sulphur and oxygen. According to the present invention the content of sulphur in this mixture is preferably up to 36 atomic percent as long as the structure remains cubic.

The optoceramic according to the present invention preferably has a content of rare earth ions of more than 100 ppm (mass proportion).

Preferably, the optoceramics according to the present invention are scintillation media.

Hence, optically transparent polycrystalline optoceramics in accordance with the present invention have pyrochlore structure and at least one optically active center, wherein the optoceramics can be described by the following general formula:

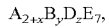
$A_{2+x}B_yD_zE_7$, wherein $0 \leq x \leq 1.1$, $0 \leq y \leq 3$, $0 \leq z \leq 1.6$, and $3x+4y+5z=8$ and A is at least one trivalent cation from the group of rare earth ions, B is at least one tetravalent cation, D is at least one pentavalent cation, and E is at least one divalent anion.

It is especially preferred that $0 \leq x \leq 1.0$, further preferred $0 \leq x \leq 0.9$, more preferred $0 \leq x \leq 0.5$, even more preferred $0 \leq x \leq 0.25$. Further, it is preferred that $x \geq 0.11$, particularly preferred $\geq 0.13$ and especially preferred $\geq 0.15$.

Next to optoceramics containing phases of pure compounds, mixed crystal phases are also possible according to the present invention. Therein, a first A cation can be replaced by a second A cation in any amounts. Preferred is that up to 50 mol %, further preferred up to 40 mol % of the first cation are replaced by the second cation. Especially preferred, up to 25% of the first A cation are replaced by the second A cation. The same applies to the B and D positions.

The optically active center is preferably selected from the group consisting of rare earth ions, transition metal ions and titanium ions. Preferably, the active centers are selected from the group consisting of rare earth ions and titanium ions. It is most preferred that the optically active center is a rare earth ion.

The application of Yb is preferably done in such amounts that it occupies a regular A-position in the lattice. Therein, the proportion, expressed in mol %, of the oxide $Yb_2O_3$ is 33 mol %±20 mol %. Yb as activator center in small amounts of <5 mol % is not preferred, depending on an application.

Transparency in the visible means an internal transmittance (i.e. light transmission minus reflection losses) which is within a range, not containing an absorption band of the activator, having a width of at least 50 nm, for example a range from 700 to 750 nm within the visible light with wavelengths of 380 nm to 800 nm, of more than 25%, preferably more than 60%, preferably more than 70%, especially preferred more than 80%, further preferred more than 90% and especially preferred more than 95% at a sample thickness of 2 mm, preferably even at a sample thickness of 3 mm, especially preferred at a sample thickness of 5 mm. Only ceramics that satisfy these requirements are regarded as optoceramics according to the present invention.

In a preferred embodiment of the present invention the optoceramic is free of La. In comparison to the components in accordance with the present invention La has bad sintering properties because it is very hygroscopic. Further, La has a negative impact on the stopping power due to its low weight.

Nevertheless, La can be used as a co-dopant in the optoceramic according to the present invention. In this case however the content is low in comparison to use of La on the A-position of the pyrochlore. On the A-position of the pyrochlore $La_2O_3$ had to be used in a molar amount of at least about 33 mol %. However, it is preferred according to the present invention that $La_2O_3$ is present in amounts only less than 20 mol %, preferably less than 10 mol % and most preferred to less than 5 mol % in the compositions according to the present invention. By observing these rules, the good sinterability and applicability as scintillator materials is conserved. Application of La as a co-dopant can become necessary in order to influence the properties of emitted light.

The components on the A-position are preferably used in the form of compounds with the stoichiometry $A_2O_3$, while the components on the B-position are preferably used in the form of compounds with the stoichiometry $BO_2$. The molar substance amounts are ideally at 33.3 mol % $A_2O_3$ and 66.6 mol % $BO_2$. However, other mixing relations that nevertheless conserve the required cubic structure are also in accordance with the present invention. Therein, the substance amount of $A_2O_3$ can be between 33.3 mol % and 60 mol %, preferably between 33.6 mol % and 43 mol %, while the substance amount of $BO_2$ is between 40 mol % and 66.6 mol %, preferably between 57 mol % and 66.4 mol %. Especially preferred are ranges in which there is a surplus of $A_2O_3$, wherein the surplus is at least 2.2 mol %, preferably at least 2.5 mol %, especially preferred at least 3.0 mol %.

The components of the D position are preferably used as compounds of the formula $O_2O_5$. Accordingly, the ideal molar substance amount in an optoceramic according to the present invention is 25 mol %. Further, mixing ratios in which $D_2O_5$ is present in a molar substance amount of 15 to 35 mol % of the optoceramic are also in accordance with the present invention.

According to a further embodiment of the present invention the optoceramic according to the present invention comprises Hf or Zr or Ti.

According to a particularly preferred embodiment of the present invention, the optoceramic according to the present invention has a composition that is selected from $Gd_2Hf_2O_7$, $Yb_2Hf_2O_7$, $Lu_2Hf_2O_7$ including respective mixed crystals with mixed A substitutes, for example $(Gd, Lu)_2Hf_2O_7$ as well as respective zirconates or titanates.

Further preferred embodiments are selected from $Lu_2(Hf, Zr)_2O_7$ as well as respective Gd and Yb compounds; further non-stoichiometric substitutes, for example $Gd_{2.24}Hf_{1.82}O_7$ or $Lu_{2.15}Hf_{1.89}O_7$. Furthermore, combined mixed crystal phases like $(Lu, Gd)_{2.12}(Zr, Hf)_{1.91}O_7$ or $Gd_3TaO_7$ are especially preferred. This is particularly true also for $Lu_3TaO_7$ and mixed crystal phases on the A and/or B position derived therefrom.

Substitution of several oxygens by several chalcogene anions, however not exceeding 4 of the 7 oxygens (S content: 4/11=36 atomic percent). The content of S in atomic percent $x_s$ is thus in the range of $0 < x_s < 36$ atomic percent. According to a preferred embodiment, the E position is completely occupied by S. Maintenance of cubic symmetry is required of all combinations.

A preferred embodiment of the present invention refers to an optoceramic comprising rare earth ions in a content of at least 100 ppm. An optoceramic that is preferred according to the present invention comprises as an activator center one or more of the ions of the elements that are selected from the group consisting of Ce, Pr, Nd, Sm, Eu, Gd, Tb, Dy, Ho, Er and Tm. Particularly preferred are Eu, Ce, Pr, Nd, Tb and Sm. In a further particularly preferred embodiment of the present invention the optoceramic according to the present invention comprises Eu in the form of $Eu^{3+}$ or $Eu^{2+}$ or a mixture thereof.

Preferably, the density of the optoceramic according to the present invention is more than 5.0 g/cm³, further preferably more than 6.0 g/cm³, further preferably more than 7.0 g/cm³ and most preferably more than 7.5 g/cm³. The effective atomic number $Z_{eff}$ of the optoceramic according to the present invention is preferably more than 50, further preferred more than or equal to 52, more preferred more than 57 and most preferred more than 60.

The optoceramics according to the present invention are characterized by an advantageously low decay time. Among others, it is the preferably short decay times that provides for application of the optoceramics in a way that is in accordance with the invention. Applications and uses that are in accordance with the invention are applications in scintillator media in measuring devices, preferably PET, CT and SPECT devices or in multifunctional devices PET/CT, PET/SPECT.

The object of the present is further attained by a method of production of optoceramics according to the present invention. This method preferably comprises the following steps:
 a) preparing a molded body from a powder mixture of the starting materials,
 b) pre-sintering the molded body at temperatures between 500 and 1200° C.,
 c) sintering of the pre-sintered molded body at temperatures between 1400 and 1900° C. in vacuum within a pressure range of between below 1 bar (i.e. slight depression) absolute and $10^{-7}$ mbar absolute, and
 d) compressing the sintered molded body at temperatures between 1400 and 2000° C. at pressures between 10 and 300 MPa.

With the method of production of the present invention it is no longer necessary to conduct time consuming single crystal breeding. Single crystal breeding has the drawback that it takes place at very high temperatures of for example about 2000° C. or more for long periods. Thereby, high costs for energy occur that lead to single crystals not being suitable for mass production. The method according to the present invention however allows for drastic reduction of energy costs and simultaneously shortens production time such that mass production of the optoceramics according to the present invention is possible. The method of production according to the present invention is particularly suitable to produce molded bodies that are very close to net shape. Thereby, expensive post-processing steps can be omitted.

Normally, polycrystalline bodies have bad transmission properties as they comprise grain boundaries so that incoming light suffers more losses on these grain boundaries than it would be the case with single crystals. As a result, it is extremely difficult to provide suitable transparent, polycrystalline optoceramics that satisfy the strict requirements that have to be met by scintillator media.

It has now surprisingly been found that rare earth ions enhance sintering of ceramics according to the present invention. It is thus preferred according to the present invention that the method of production according to the present invention comprises addition of rare earth oxides or rare earth chalcogenides as sintering aids.

The sintering aids provide for production of a particularly high-value optoceramic in leading to an optoceramic that has particularly good transmission properties. This can be explained by the sintering aids forming eutectics with the other components of the powder mixture on the grain boundaries of the molded body so that the sintering process is faster and more thoroughly.

In order to facilitate formation of eutectics it is preferred that the sintering aids according to the present invention are not identical with the components that are the main components of the optoceramic. Hence, the sintering aids are preferably not those components that occupy positions A, B or D in the optoceramic.

By observing the prerequisites of the above-described method of production, optoceramics according to the present invention are obtained that have the mentioned outstanding properties.

EXAMPLES

1. Example for the Production of a Transparent Ceramic of the Composition Ce:Gd$_2$Hf$_2$O$_7$ and Celu$_2$Hf$_2$O$_7$ by Uniaxial Compression (with Reactive sintering)

Powder with primary particles having diameters of <1 μm of CeO$_2$, Gd$_2$O$_3$ or Lu$_2$O$_3$ and HfO$_2$ were weighed in the ratios according to the target composition. After addition of dispersing agent and binder, the batch is blended with ethanol and ZrO$_2$ balls in a ball mill during 12 h.

The grinding suspension was then dried on a hotplate.

The powder was afterwards compressed uniaxially into disks. The pressure conditions were at about 20 MPa, the compression time was a few seconds. The preformed compact was densified in a cold isostatic press, wherein the pressure was about 180 MPa. The pressure transferring medium was water.

Afterwards, the binder was burnt out in a first thermal step. The tempering time was 2.5 h and the temperature was 700° C. The burnt out green body was afterwards sintered in a vacuum sintering oven (depression: 10$^{-5}$ mbar). Sintering to an almost pore-free body was done at higher temperatures of 1800° C. during 5 h.

During the following step of hot isostatic pressing (HIP) the closed pores were removed, the HIP conditions were 1780° C.-2 h-Ar-200 MPa.

Optically transparent and homogeneous bodies were obtained that could be further processed. The decay time was 66 ns (measured with LED at 336 nm) for the optoceramic 0.1 wt % Ce$^{3+}$:Gd$_2$Hf$_2$O$_7$.

2. Example for the Production of a Transparent Ceramic of the Composition Eu:Yb$_2$(Zr,Ti)$_2$O$_7$ by Uniaxial Compression (with Reactive Sintering)

Powder with primary particles having diameters of <1 μm of Eu$_2$O$_3$, Yb$_2$O$_3$, ZrO$_2$ and TiO$_2$ were weighed in the ratios according to the target composition. Grinding took place in ethanol with ZrO$_2$ balls, wherein the grinding suspension was also mixed with binders and surface active agents. Grinding took place overnight.

The grinding suspension was then granulated with a spray dryer.

The granulate was afterwards compressed uniaxially into disks. The pressure conditions were at about 10 MPa, the compression time was about one minute. The preformed compact was densified in a cold isostatic press, wherein the pressure was about 225 MPa. The pressure transferring medium was oil.

Afterwards, the binder was burnt out in a first thermal step. The tempering time and temperature was 2 h and 900° C. The burnt out green body was afterwards sintered in a vacuum sintering oven (depression: 10$^{-6}$ mbar). Sintering to an almost pore-free body was done at higher temperatures between 1600 to 1800° C. during 5 h.

During the following step of hot isostatic pressing (HIP) the closed pores were removed, the HIP conditions were 1700° C.-10 h-Ar-200 MPa. After hot isostatic pressing the sample was re-oxidized in a further terminal step (1000° C., 5 hours, O$_2$ stream).

Optically transparent and homogeneous bodies were obtained that could be further processed. The decay time was 1.5 ms for the optoceramic 0.1 wt % Eu$^{3+}$:Yb$_2$(Zr,Ti)$_2$O$_7$.

3. Example for the Production of a Transparent Ceramic of the Composition Pr:Lu$_2$Zr$_2$O$_7$ by Hot Casting (with Reactive Sintering)

Powder with nanoscale primary particles (<100 nm in diameter) of Pr$_2$O$_3$, Lu$_2$O$_3$ and ZrO$_2$ were weighed in the ratio according to the target composition. In a heated ball mill the powder batch was mixed with the thermoplastic binder (mixture of 75 wt % paraffin and 25 wt % microscale wax) and the surface active agent siloxane polyglycol ether (single molecular covering of the ceramic particle surface) at 80° C. Therein the viscosity of the final slurry was 2.5 Pas at a solid particle content of 60 vol %. With a casting pressure of 1 MPa the slurry was cast directly into the plastic mold (hot casting). Stripping of the binder was done after demolding above the melting point of the wax used, wherein about 3 wt % remained in the green body in order to provide for dimension stability.

The binder and surfactants that remained in the green body were burnt out during the subsequent sintering process. Vacuum sintering was done with a heating reate of 300 K/h up to 1000° C. and a hold time of 1 h followed by a further heating step to 1650° C. The vacuum conditions were at 10$^{-5}$ to 10$^{-6}$ mbar. HIP was done with a heating rate of 300 K/min to 1650° C. and a hold time of 15 h at a pressure of 200 MPa.

Optically transparent and homogeneous bodies were obtained that could be further processed. The decay time was 450 ns for the optoceramic 0.5 wt % Pr$^{3+}$:Lu$_2$Zr$_2$O$_7$.

4. Example for the Production of a Transparent Ceramic of the Composition Ce:Gd$_{2.24}$Hf$_{1.82}$O$_7$ or Ce:Lu$_{2.15}$Hf$_{1.89}$O$_7$ by Uniaxial Compression (with Reactive Sintering)

The process was essentially conducted as described in example 1.

Powder with primary particles having diameters of <1 μm of CeO$_2$, Gd$_2$O$_3$ and HfO$_2$ were weighed in the ratios according to the target composition (38 mol % Gd$_2$O$_3$ and 62 mol % HfO$_2$). After addition of dispersing agent and binder, the batch is blended with ethanol and ZrO$_2$ balls in a ball mill during 12 h.

The grinding suspension was then dried on a hotplate.

The powder was afterwards uniaxially compressed into disks. The pressure conditions were at about 20 MPa, the compression time was 15 seconds. The preformed compact was densified in a cold isostatic press, wherein the pressure was about 200 MPa. The pressure transferring medium was oil.

Afterwards, the binder was burnt out in a first thermal step. The tempering time and temperature was 3 h and 700° C. The burnt out green body was afterwards sintered in a vacuum sintering oven (depression: 10$^{-5}$ mbar). Sintering to an almost pore-free body was done at higher temperatures of 1700° C. during 6 h.

During the following step of hot isostatic pressing (HIP) the closed pores were removed, the HIP conditions were 1780° C.-2 h-Ar-200 MPa.

Optically transparent and homogeneous bodies were obtained that could be further processed. The decay time was about 70 ns.

5. Example for the Production of a Transparent Ceramic of the Composition Ce:Gd$_3$TaO$_7$ Powder with primary particles having diameters of <1 μm of CeO$_2$, Gd$_2$O$_3$ and Ta$_2$O$_5$ were weighed in the ratios according to the target composition. After addition of dispersing agent and binder, the batch is blended with ethanol and ZrO$_2$ balls in a ball mill during 12 h.

The grinding suspension was then granulated with a spray dryer.

The granulate was afterwards uniaxially compressed into disks. The pressure conditions were at about 20 MPa, the compression time was 15 seconds. The preformed compact was densified in a cold isostatic press, wherein the pressure was about 225 MPa. The pressure transferring medium was water.

Afterwards, the binder was burnt out in a first thermal step. The tempering time and temperature was 3 h and 600° C. The burnt out green body was afterwards sintered in a vacuum sintering oven (depression: 10$^{-5}$ mbar). Sintering to an almost pore-free body was done at higher temperatures of 1800° C. during 5 h.

During the following step of hot isostatic pressing (HIP) the closed pores were removed, the HIP conditions were 1780° C.-5 h-Ar-200 MPa.

Optically transparent and homogeneous bodies were obtained that could be further processed.

While the invention has been illustrated and described as embodied in active optoceramics with cubic crystal structure, their production and uses, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A transparent polycrystalline optoceramic, single grains of which have a symmetric cubic structure, said cubic structure of said single grains being isotypic to that of pyrochlore or fluorite, or unambiguously derivable therefrom in crystal structure terms, with at least one optically active center selected from the group consisting of rare earth ions, transition metal ions and titanium ions, wherein the optoceramic has the following formula:

$A_{2+x}B_yD_zE_7$, wherein $0 \leq x \leq 1.1$, $0 \leq y \leq 3$, $0 \leq z \leq 1.6$, and $3x+4y+5z=8$, and wherein A is at least one trivalent rare earth cation and is selected from the group consisting of Y$^{+3}$, Gd$^{+3}$, Yb$^{+3}$, Lu$^{+3}$, Sc$^{+3}$ and mixtures thereof, B is at least one tetravalent cation, D is at least one pentavalent cation, and E is at least one divalent anion, and wherein the optoceramic has a rare earth ion content of more than 100 ppm.

2. The optoceramic according to claim 1, wherein A is Gd, Lu or a mixture of Gd and Lu.

3. The optoceramic according to claim 1, wherein B is selected from the group consisting of Zr, Ti, Hf, Sn, Ge and mixtures thereof.

4. The optoceramic according to claim 1, wherein B is selected from the group consisting of Zr, Ti, Hf and mixtures thereof.

5. The optoceramic according to claim 1, wherein B is selected from the group consisting of Zr, Hf and mixtures thereof.

6. The optoceramic according to claim 1, wherein B is selected from the group consisting of Ti, Hf and mixtures thereof.

7. The optoceramic according to claim 1, containing Ti in an amount from more than 100 ppm to 30,000 ppm per weight unit.

8. The optoceramic according to claim 1, wherein D comprises Nb and/or Ta.

9. The optoceramic according to claim 1, having a stoichiometry defined by $A_2B_2E_7$.

10. The optoceramic according to claim 1, having an effective atomic number of more than 50.

11. The optoceramic according to claim 1, wherein E is a chalcogene or a mixture of chalcogenes.

12. The optoceramic according to claim 1, wherein E is oxygen.

13. The optoceramic according to claim 1, wherein E is a mixture of sulphur and oxygen with a sulphur content of up to 36 atomic percent.

14. The optoceramic according to claim 1, containing an activator center, and wherein said activator center comprises one or more element selected from the group consisting of Ce, Pr, Nd, Sm, Eu, Gd, Tb, Dy, Ho, Er and Tm.

15. The optoceramic according to claim 1, containing an activator center, and wherein said activator center comprises one or more element selected from the group consisting of Ce, Pr, Nd and Eu.

16. The optoceramic according to claim 1, having a density of more than 5 g/cm$^3$.

17. A method of producing a transparent polycrystalline optoceramic, single grains of which have a symmetric, cubic structure, with at least one optically active center, said method comprising the steps of:
  a) preparing a molded body from a powder mixture of starting materials required for making the optoceramic;
  b) pre-sintering the molded body at temperatures between 500 and 1200° C. to form a pre-sintered molded body;
  c) sintering the pre-sintered molded body at temperatures between 1400 and 1900° C. in vacuum within a pressure range of between below 1 bar absolute and 10$^{-7}$ mbar absolute to form a sintered molded body, and
  d) compressing the sintered molded body at the temperatures between 1400 and 2000° C. with a pressure between 10 and 300 MPa;
  wherein the transparent polycrystalline optoceramic, single grains of which have a symmetric cubic structure, said cubic structure of said single grains bein isotypic to that of pyrochlore or fluorite or unambiguously derivable therefrom, with at least one optically active center selected from the rou consisting of rare earth ions, transition metal ions and titanium ions wherein the optoceramic has the following formula:

$A_{2+x}B_yD_zE_7$, wherein 0≦x≦1.1, 0≦y≦3, 0≦z≦1.6, and 3x+4y+5z=8, and wherein A is at least one trivalent rare earth cation and is selected from the rou consistin of Y$^{+3}$, Gd$^{+3}$, Yb$^{+3}$, Lu$^{+3}$, Sc$^{+3}$ and mixtures thereof, B is at least one tetravalent cation, D is at least one pentavalent cation, and E is at least one divalent anion, and wherein the o toceramic has a rare earth ion content of more than 100 ppm.

18. A scintillator medium comprising a transparent polycrystalline optoceramic, single grains of which have a symmetric cubic structure said cubic structure of said single grains being isotypic to that of pvrochlore or fluorite, or unambiguously derivable therefrom in crystal structure terms with at least one optically active center selected from the group consisting of rare earth ions, transition metal ions and titanium ions wherein the optoceramic has the following formula:

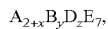

$A_{2+x}B_yD_zE_7$, wherein 0≦x≦1.1, 0≦y≦3, 0≦z≦1.6, and 3x+4y+5z=8, and wherein A is at least one trivalent rare earth cation and is selected from the group consisting of Y$^{+3}$, Gd$^{+3}$, Yb$^{+3}$, Lu$^{+3}$, Sc$^{+3}$ and mixtures thereof, B is at least one tetravalent cation D is at least one pentavalent cation, and E is at least one divalent anion and wherein the opoceramic has a rare earth ion content more than 100 ppm.

19. A scintillator medium in medical imaging, comprising an optoceramic according to claim 1.

20. A scintillator medium in the security field or resources exploration, comprising an optoceramic according to claim 1.

21. A scintillator medium in the field of resources exploration, comprising an optoceramic according to claim 1.

22. A scintillator medium in an X-ray scanner, comprising an optoceramic according to claim 1.

23. The optoceramic according to claim 1, wherein said optically active center comprises an ion of an element selected from the group consisting of Ce, Pr, Nd, Sm and Eu.

24. A transparent polycrystalline optoceramic, single grains of which have a symmetric cubic structure, with at least one optically active center and with a composition of Ce:Gd$_2$Hf$_2$O$_7$, Ce:Lu$_2$Hf$_2$O$_7$, Eu:Yb$_2$(Zr,Ti)$_2$O$_7$, Pr:Lu$_2$Zr$_2$O$_7$, Ce:Gd$_{2.24}$Hf$_{1.82}$O$_7$, Ce:Lu$_{2.15}$Hf$_{1.89}$O$_7$ or Ce:Gd$_3$TaO$_7$; and wherein the optoceramic has a rare earth ion content of more than 100 ppm.

* * * * *